(12) United States Patent
Kotani et al.

(10) Patent No.: US 7,878,715 B2
(45) Date of Patent: Feb. 1, 2011

(54) THRUST ROLLER BEARING

(75) Inventors: Kazuyuki Kotani, Toyota (JP);
Yoshihito Nakashima, Kariya (JP)

(73) Assignee: Jtekt Corporation, Osaka (JP)

( * ) Notice: Subject to any disclaimer, the term of this patent is extended or adjusted under 35 U.S.C. 154(b) by 342 days.

(21) Appl. No.: 11/709,813

(22) Filed: Feb. 23, 2007

(65) Prior Publication Data

US 2007/0206894 A1   Sep. 6, 2007

(30) Foreign Application Priority Data

Mar. 2, 2006   (JP) .................... P2006-055704

(51) Int. Cl.
*F16C 33/46* (2006.01)

(52) U.S. Cl. ................. 384/623; 384/618; 384/621

(58) Field of Classification Search ......... 384/470–472, 384/572, 576, 580, 614, 618, 620, 621, 623
See application file for complete search history.

(56) References Cited

U.S. PATENT DOCUMENTS

| | | | | |
|---|---|---|---|---|
| 3,144,284 | A * | 8/1964 | Ortegren | 384/574 |
| 3,240,542 | A * | 3/1966 | Jahn | 384/623 |
| 3,240,543 | A * | 3/1966 | Benson | 384/623 |
| 3,802,754 | A * | 4/1974 | Pitner | 384/580 |
| 4,710,039 | A * | 12/1987 | Huttner | 384/574 |
| 5,232,290 | A * | 8/1993 | Buschle et al. | 384/584 |
| 5,584,583 | A * | 12/1996 | Hidano | 384/470 |
| 5,630,670 | A * | 5/1997 | Griffin et al. | 384/623 |
| 6,068,406 | A * | 5/2000 | Yoshida et al. | 384/580 |
| 6,102,580 | A * | 8/2000 | Alling et al. | 384/607 |
| 6,106,158 | A * | 8/2000 | Hayashi et al. | 384/623 |
| 6,478,467 | B1 * | 11/2002 | Graber | 384/51 |
| 7,066,655 | B2 * | 6/2006 | Fujioka et al. | 384/618 |
| 2004/0091193 | A1 * | 5/2004 | Obayashi et al. | 384/623 |
| 2006/0126984 | A1 * | 6/2006 | Takamizawa | 384/572 |
| 2006/0159380 | A1 * | 7/2006 | Oishi | 384/623 |

FOREIGN PATENT DOCUMENTS

| | | | |
|---|---|---|---|
| DE | 102005009772 | * | 9/2006 |
| JP | 63-129714 | | 8/1988 |
| JP | 64-55322 | | 4/1989 |
| JP | 10220482 A | * | 8/1998 |
| JP | 10252654 A | * | 9/1998 |
| JP | 2002-250347 | | 9/2002 |
| JP | 2004211824 A | * | 7/2004 |
| JP | 2005195086 A | * | 7/2005 |

* cited by examiner

*Primary Examiner*—Marcus Charles
(74) *Attorney, Agent, or Firm*—McGinn IP Law Group, PLLC

(57) ABSTRACT

A cage of a thrust roller bearing includes: a pair of crank-shaped bent portions arranged in a circumferential direction of the cage; a pair of inner wall surfaces arranged in a radial direction of the cage; and a pocket for housing a roller defined by the pair of bent portions and the pair of inner wall surfaces and formed by punching the cage. Radially inner one of the inner wall surfaces is formed as a guiding surface for guiding a substantial roller PCD position of an end surface of the roller. Each of the pair of bent portions includes a first extended portion extending in one of cage thickness directions and a second extended portion extending in the other cage thickness direction. A roller retaining pawl for retaining the roller is provided at each of the first and second extended portions so as to protrude into the pockets.

19 Claims, 5 Drawing Sheets

THRUST ROLLER BEARING

BACKGROUND OF THE INVENTION

The present invention relates to a thrust roller bearing, and prevents thrust needle rollers from coming out of a cage.

In the thrust roller bearing of the related art having rollers and a cage for holding the rollers, the cage is generally made of a press molding of a thin steel plate, and has ribs at the radially outer side end portion and at the radially inner side end portion. Moreover, pockets for mounting a plurality of rollers of the cage are so formed by a punching work and have a structure in which bent portions positioned across the individual PCD (pitch circle diameter) positions of the rollers in the axial direction are formed at two radial end portions and at the central portions of the individual pockets. The individual rollers are prevented (as referred to Patent Document 1, for example) from coming out in the axial direction of the cage (in the vertical direction) by the roller retaining portions formed at the bent portions in the pockets of the cage.

Patent Document 1: JP-UM-A-64-55322

In this thrust roller bearing of the related art, in the preassembled state before the assembly with a shaft, the rollers are retained in the pockets of the cage. However, the roller is inclined when an external force acts on the roller. Then, the end surfaces of the roller are brought out of engagement with the roller end surface guiding surfaces of the pocket due to the inclination of the roller, so that the roller moves toward the rib side. At this time, the rib inner surfaces act as the surfaces to prevent the roller from coming out.

In the cage structure of the related art provided with three bent portions at the pocket, on the other hand, the radial length of the pocket becomes short, especially in case the roller used has a small entire length. As a result, the roller retaining portions disposed at each bent portion become narrow and hard to form precisely.

As a result, when the roller is inclined to move so far that its end surface is supported by the inner surface of the rib, the roller is not caught on the roller end surface side on the opposite side by the roller retaining portion but may not be retained thereby the rollers coming out.

Here, in order to reduce the movement of the inclined roller till the roller end surface is supported by the inner surface of the rib of the cage, it is necessary to minimize the clearance between the radial end surface portion of the pocket for guiding the roller end surface and the aforementioned rib inner surface. However, the rib is formed by the pressing, and therefore the reduction in the clearance is limited and dispersed.

In case the clearance is enlarged by that dispersion, therefore, the rib inner surface does not act as the stopping surface, and the roller may come out of the cage.

On the other hand, in order to relax the stress, the cage is requested to make the radius of curvature of the four inner corners of the pocket as large as possible, whereas the roller is requested to make its effective length as large as possible thereby to increase the load capacity of the bearing. For this request, it is desired to enlarge the effective length of the roller by reducing the chamfer of the end surfaces of the roller. In order to avoid the interference of the two end edges of the roller with the four inner corners of the pocket, however, the radius of curvature of the inner corners is set smaller than that of the round chamfers at the end surfaces of the roller. As a result, the cage may have an insufficient fatigue strength.

SUMMARY OF THE INVENTION

The invention has been conceived to solve those problems, and has an object to provide a thrust roller bearing, which uses rollers of a short entire length and which can prevent the rollers from coming out of a cage thereby to improve the bearing lubrication and the cage strength at low cost.

In order to solve the above problem, the present invention is characterized by having the following arrangement.

(1) A thrust roller bearing comprising:
   a cage that is made of an annular plate, the cage including:
      a pair of crank-shaped bent portions formed at a radially intermediate area of the cage, the pair of bent portions being arranged in a circumferential direction of the cage;
      a pair of inner wall surfaces arranged in a radial direction of the cage; and
      a pocket for housing a roller, the pocket being defined by the pair of bent portions and the pair of inner wall surfaces and formed by punching the cage,
   wherein radially inner one of the inner wall surfaces is formed as a guiding surface for guiding a substantial roller PCD position of an end surface of the roller,
   wherein each of the pair of bent portions includes a first extended portion extending in one of cage thickness directions and a second extended portion extending in the other cage thickness direction, and
   wherein a roller retaining pawl for retaining an outer circumference of the roller is provided at a top side surface of each of the first and second extended portions so as to protrude into the pockets.

(2) The thrust roller bearing according to (1), wherein axially opposite ends of the roller are chamfered, corners of the pocket are rounded, and
   a protrusion that abuts against and pivotally supports a center portion of the end surface of the roller is provided at the guide surface.

As has been described hereinbefore, according to the thrust roller bearing of the invention, the cage includes the crank-shaped bent portions bent to extend individually in one and the other thickness directions, and substantially rectangular pockets punched and formed in a plurality of portions in the circumferential direction of the annular plate. Of the inner wall surfaces forming that pocket, the inner wall surfaces on the inner side and the outer side of the radial direction are made the roller end surface guiding surfaces for guiding substantial PCD positions of the end surfaces of the roller. This makes it possible to set the inner wall surfaces on the radially inner side and on the radially outer side as the guide surfaces of the roller end surfaces and as the support surfaces at the instant when the rollers are inclined.

Moreover, the inner wall surfaces on the radially inner side and on the radially outer side are precisely worked by punching them. In case the rollers are held in the pockets of the cage, therefore, the clearances of the rollers from the end surfaces can be reduced so that the rollers can be set not to be inclined at a predetermined level or more. The end surfaces do not come out, even the external force acts on the rollers, from the roller end surface guiding surfaces of the pockets.

Moreover, the first extended portions, as extended in one direction of the cage thickness, and the second extended portions, as extended in the other direction of the cage thickness, of the crank-shaped bent portions are individually positioned on the two sides of the individual pockets of the circumferential direction, and are provided with roller retaining pawls protruding into the pockets for retaining the outer circumferences of the rollers. As a result, the rollers are not only supported by the roller end surface guiding surfaces of the pockets but also prevented from coming out of the pockets by the roller retaining pawls which are disposed at the top side surfaces of the first extended portions and the second extended portions of the crank-shaped bent portions, so that the rollers can be reliably prevented from coming out from the cage.

According to the invention, the protrusions receive the axially inner and outer end surfaces of the roller before the chamfered portions of the roller abut against the inner corners of the pocket so that the roller does not interfere with the inner corners of the pocket. By making the radius of curvature of the inner corners of the pocket as large as possible, therefore, the fatigue strength of the cage can be improved. By reducing the chamfer of the roller, moreover, the effective orbit length of the roller can be enlarged to increase the load capacity, and the working time period can be shortened to reduce the cost.

Still moreover, the substantially central portions of the end surfaces of the roller are pivotally supported while abutting against the top portion of the projection. As a result, these abutting portions have the frictional resistance of substantial zero, so that the friction loss is reduced.

DETAILED DESCRIPTION OF PREFERRED EMBODIMENTS

Embodiment 1

Figure 1:
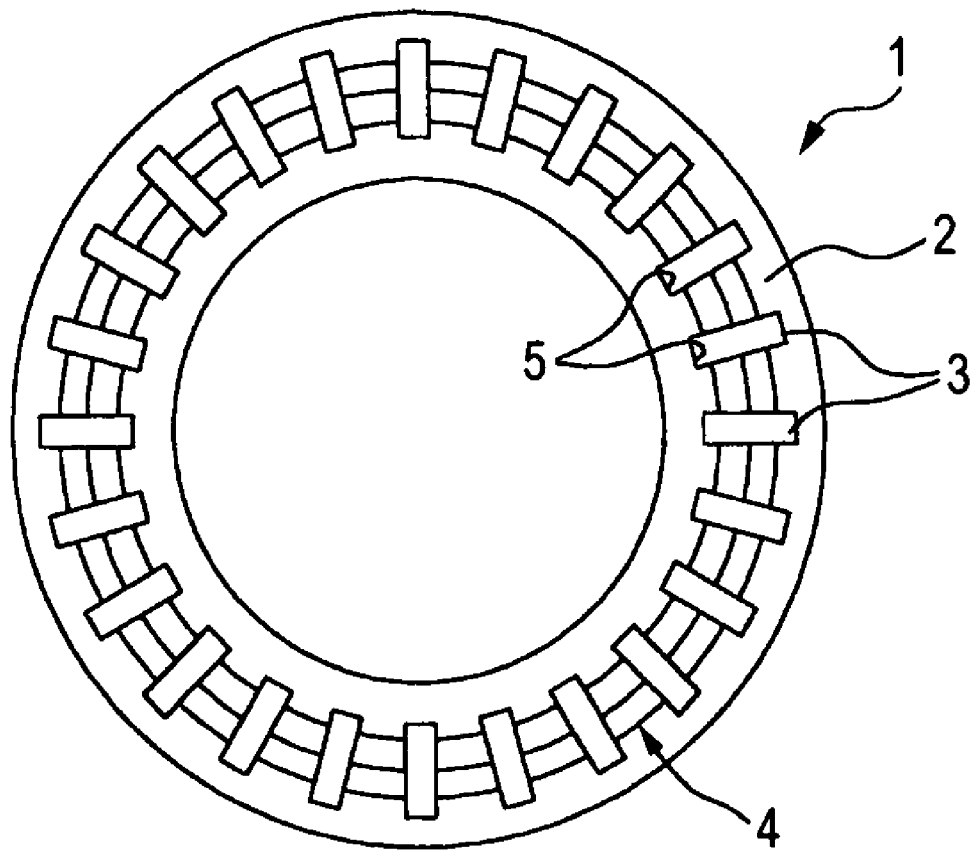
FIG. 1 is a top plan view showing a thrust roller bearing according to Mode of Embodiment 1 of the invention.
Figure 2:
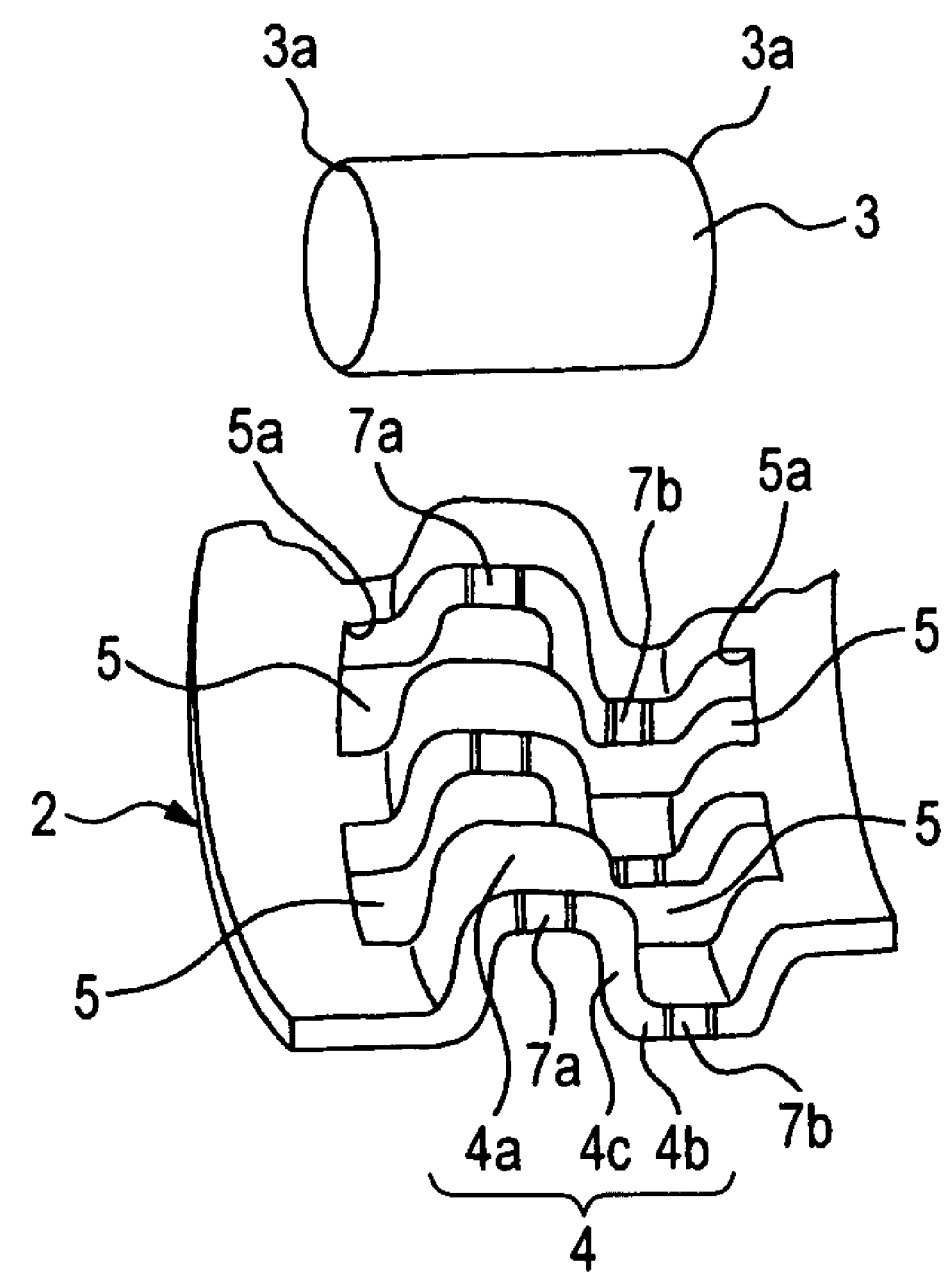
FIG. 2 is a perspective view showing the pocket periphery of the same thrust roller bearing in an enlarged scale.
Figure 3:
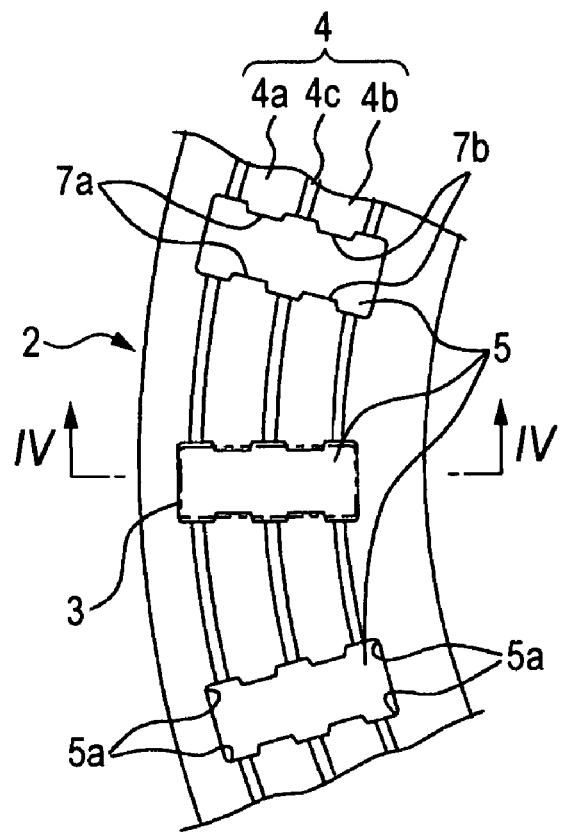
FIG. 3 is a top plan view showing the pocket periphery of the same thrust roller bearing in an enlarged scale.
Figure 4:
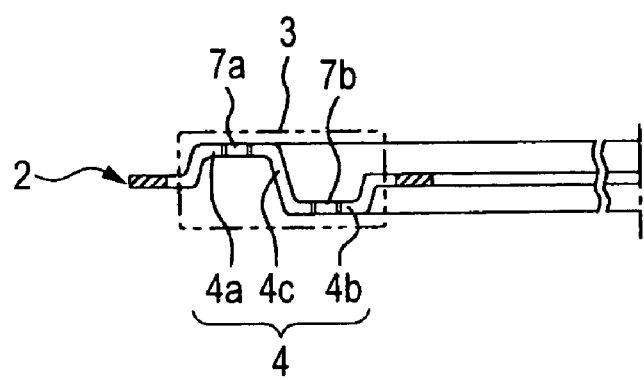
FIG. 4 is a sectional view along line IV-IV of FIG. 3.
Figure 5A:
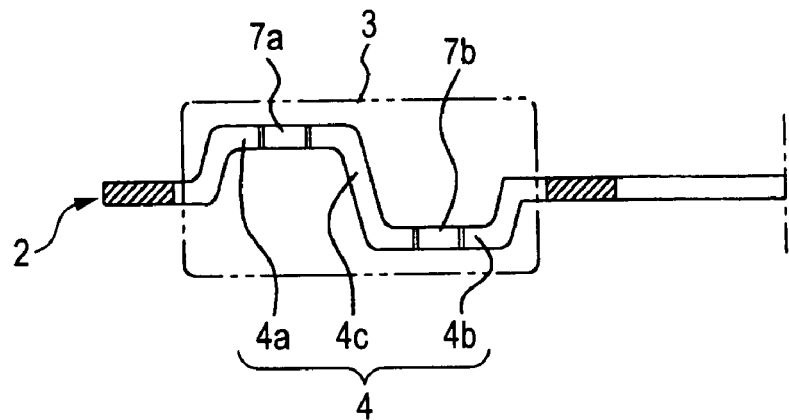
FIGS. 5A to 5C are sectional views showing the various mounted states of the rollers in the cage of the same thrust roller bearing.
Figure 5B:
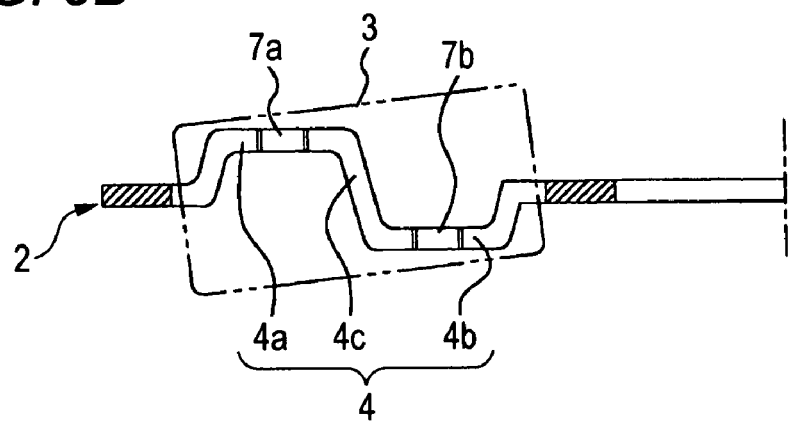
Figure 5C:
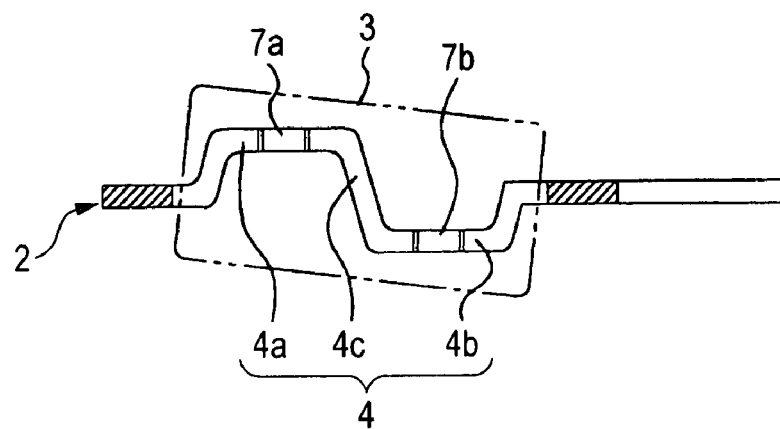

FIG. 1 is a top plan view showing a thrust roller bearing according to Embodiment 1 of the invention; FIG. 2 is a perspective view showing the pocket periphery of the same thrust roller bearing in an enlarged scale; FIG. 3 is a top plan view showing the pocket periphery of the same thrust roller bearing in an enlarged scale; FIG. 4 is a sectional view along line IV-IV of FIG. 3; and FIG. 5A to FIG. 5C are sectional views showing the various mounted states of the rollers in the cage of the same thrust roller bearing.

In the drawings, the thrust roller bearing 1 according to Embodiment 1 of the invention is structured to include a thrust roller bearing 1, a cage 2 and a plurality of rollers 3.

The cage 2 is made of one annular plate and drawn to have a crank-shaped axially bent portion 4 at its radially intermediate area.

Each of the crank-shaped bent portions 4 is composed of radially outer and inner side extended portions 4a and 4b, which are so extended in one and the other thickness directions of the cage 2 as to have substantially equal lengths, and an intermediate slope portion 4c positioned at a radially intermediate portion between the two extended portions 4a and 4b. The extended portion 4a on the radially outer side is extended in one thickness direction of the cage 2, and the extended portion 4b on the radially inner side is extended in the other thickness direction of the cage 2.

In the crank-shaped bent portion 4 of the cage 2, pockets 5 having a substantially rectangular shape in a top plan view are punched out in the thickness direction at a plurality of circumferential portions from the bend starting point on the radially outer side to the bend starting point on the radially inner side.

In each of the pockets 5, the roller 3 is so confined in a rotatable state as does not leave the pocket 5.

The structure, in which the rollers 3 are confined not to leave the pockets 5, is described.

The radially outer side extended portions 4a and the radially inner side extended portions 4b of the crank-shaped bent portion 4, which are individually positioned on the two circumferential sides of each pocket 5, are provided with such roller retaining pawls 7a and 7b individually on the top side surfaces of the extending directions as protrude into the pockets 5.

By these roller retaining pawls 7a and 7b, in each pocket 5, the circumferential width sizes at two radial portions are made smaller than the diameter size of the roller 3 so that the roller 3 is prevented from coming out of the pocket 5. Here, the roller 3 is forcibly fitted in the pocket 5 so that it is confined not to leave the pocket 5.

The roller 3 is of the type, in which the shape of its end surfaces are called flat, and its two axial end edges are chamfered. These chamfered portions are designated by reference numeral 3a.

In the cage 2, moreover, the four inner corners 5a of the inner wall surfaces forming the pocket 5 are rounded.

Here is described the case, in which an external force acts on the roller 3 being retained in the pocket 5 of the cage, so that the roller 3 is inclined.

The roller 3 is normally retained in the pocket 5 of the cage, as shown in FIG. 5A. When the external force acts on the roller 3 so that the roller 3 is inclined to have its right end portion moved upward and its left end portion moved downward, as shown in FIG. 5B. At this time, the two end edges of the inclined roller 3 are not only supported by the end edges of the end surface guiding surfaces of the pocket 5 but also supported in the upward direction by the roller retaining pawl 7a disposed at the top side surface of the extended portion 4a on the radially outer side and in the downward direction by the roller retaining pawl 7b disposed at the top side surface of the extended portion 4b on the radially inner side. As a result, the roller 3 does not come out of the pocket 5.

When the external force acts on the roller 3 so that the roller 3 is inclined to have its left end portion moved upward and its right end portion moved downward, as shown in FIG. 5C. At this time, the two end edges of the inclined roller 3 are not only supported by the end edges of the end surface guiding surfaces of the pocket 5 but also supported in the upward direction by the roller retaining pawl 7a disposed at the top side surface of the extended portion 4a on the radially outer side and in the downward direction by the roller retaining pawl 7b disposed at the top side surface of the extended portion 4b on the radially inner side. As a result, the roller 3 does not come out of the pocket 5.

Therefore, the roller 3 retained in the pocket 5 of the cage is reliably prevented from coming out of the cage 2, even if the external force acts to incline the roller 3.

One example of the procedure for manufacturing the cage 2 is described in the following.

At first, a center hole is punched out at a predetermined portion of one metal plate (e.g., SPCD of the JIS standards), and is then drawn to form the crank-shaped bent portion 4.

After this, the pocket 5 is pushed out, and the radially outer portion is cut off. Simultaneously with this formation of the pocket 5, the inner corners 5a of the pocket 5 are rounded, and the roller retaining pawls 7a and 7b are formed.

Therefore, the punch die of the pocket 5 is manufactured in advance to have a shape matching that of the pocket 5 including the inner corners 5a and the roller retaining pawls 7a and 7b.

In case this procedure is adopted, the troubles to form the inner corners 5a of the pocket 5 and the roller retaining pawls 7a and 7b independently of each other can be eliminated to make it unnecessary to increase the step of manufacturing the cage 2. In addition, the pocket 5 can be precisely formed with ease merely by managing the punching shape of the punch die of the pocket 5.

As has been described hereinbefore, according to Embodiment 1, the cage 2 includes the crank-shaped bent portion 4 bent to extend in one and the other thickness directions, and substantially rectangular pockets 5 punched and formed in a plurality of portions in the circumferential direction of the annular plate. Of the inner wall surfaces forming that pocket 5, the inner wall surfaces on the inner side and the outer side of the radial direction are made the roller end surface guiding surfaces for guiding substantial PCD (Pitch Circle Diameter) positions of the opposite end surfaces of the roller. This makes it possible to set the inner wall surfaces on the radially inner side and on the radially outer side as the guide surfaces for guiding the end surfaces of the rollers 3 and as the support surfaces at the instant when the rollers are inclined.

Moreover, the inner wall surfaces on the radially inner side and on the radially outer side are precisely worked by punching them. In case the rollers are held in the pockets 5 of the cage 2, therefore, the clearances of the rollers 3 from the end surfaces can be reduced so that the rollers 3 can be set not to be inclined at a predetermined level or more. The end surfaces do not come out, even the external force acts on the rollers 3, from the roller end surface guiding surfaces of the pockets 5.

Moreover, the radially outer side extended portions 4a, as extended in one direction of the cage thickness, and the radially inner side extended portions 4b, as extended in the other direction of the cage thickness, of the crank-shaped bent portions 4 are individually positioned on the two sides of the individual pockets 5 of the circumferential direction, and are provided with roller retaining pawls 7a and 7b protruding into the pockets 5 for retaining the outer circumferences of the rollers 3. As a result, the rollers 3 are not only supported by the roller end surface guiding surfaces of the pockets 5 but also prevented from coming out of the pockets 5 by the roller retaining pawls 7a and 7b which are disposed at the top side surfaces of the radially outer side extended portions 4a and the radially inner side extended portions 4b of the crank-shaped bent portions 4, so that the rollers 3 can be reliably prevented from coming out from the cage 2.

In Embodiment 1 thus far described, the radially outer side extended portions 4a, as positioned on the radially outer side, and the radially inner side extended portions 4b, as positioned on the radially inner side, of the crank-shaped bent portions 4 are individually positioned on the opposite sides of the individual pockets 5, and are provided with roller retaining pawls 7a and 7b, respectively, which protrude into the pockets 5. It is, however, arbitrary to form the roller retaining pawls 7a either only on the side surfaces of the top sides of the radially outer side extended portions 4a or only on the side surfaces of the top sides of the radially inner side extended portions 4b.

At the individual pockets 5, moreover, the radially outer side extended portions 4a, as positioned on one side of the circumference direction, of the crank-shaped bent portions 4, maybe provided with the roller retaining pawls 7a on their top side surfaces, and the radially inner side extended portions 4b, as positioned on the other side of the circumference direction, of the crank-shaped bent portions 4, may be provided with the roller retaining pawls 7b on their top side surfaces.

Embodiment 2

Figure 6:
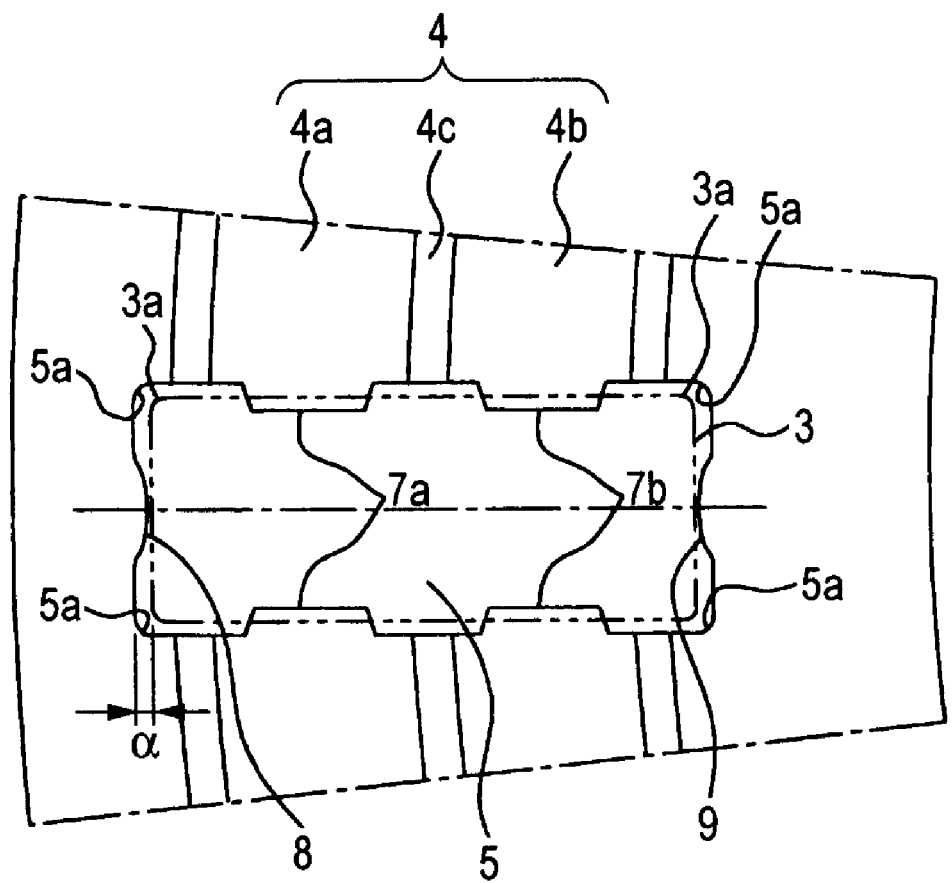
FIG. 6 is a top plan view showing a portion of the pocket periphery of a thrust roller bearing of Mode of Embodiment 2 of the invention in an enlarged scale.

FIG. 6 is a top plan view showing a portion of the pocket periphery of a thrust roller bearing of Embodiment 2 of the invention in an enlarged scale.

In FIG. 6, the structures similar to those of Embodiment 1 are omitted on their overlapped description by designating them by the common reference numerals.

In Embodiment 2, as shown in FIG. 6, of the inner wall surfaces of the pocket 5, the individual wall surface portions on the radially outer side and on the radially inner side are provided with protrusions 8 and 9 protruded into the pocket 5, so that the axially inner and outer end surfaces of the roller 3 are received by the protrusions 8 and 9 before the chamfered portions 3a of the roller 3 abut against the inner corners 5a of the pocket 5.

In this case, the protrusions 8 and 9 are disposed at positions where they abut against the center portions of the outer end surface and the inner end surface of the roller 3 in the axial direction thereby to support the roller 3 pivotally.

These protrusions 8 and 9 are curved round in a top plan view, and the protruding size a of the protrusions 8 and 9 is so set that the chamfered portions 3a of the roller 3 are kept away from contact with the inner corners 5a of the pocket 5 while the end surfaces of the roller 3 are abutting against the protrusions 8 and 9.

As in Embodiment 2, of the inner wall surfaces of the pocket 5, the structure is made such that the protrusions 8 and 9 are so disposed at the individual wall surface portions on the radially outer side and on the radially inner side as to protrude into the pocket 5. In this case, the protrusions 8 and 9 receive the axially inner and outer end surfaces of the roller 3 before the chamfered portions 3a of the roller 3 abut against the inner corners 5a of the pocket 5 so that the roller 3 does not interfere with the inner corners 5a of the pocket 5. By making the radius of curvature of the inner corners 5a of the pocket 5 as large as possible, therefore, the fatigue strength of the cage 2 can be improved. By reducing the chamfer of the roller 3, moreover, the area of the end surfaces of the roller 3 can be enlarged to facilitate the support of the end surfaces when the roller 3 is inclined.

By reducing the chamfer of the roller 3, moreover, the effective orbit length of the roller 3 can be enlarged to increase the load capacity, and the working time period can be shortened to reduce the cost. Here, the chamfered portions 3a of the roller 3 are worked by means of a barrel. By reducing the chamfered portions 3a, however, the time period necessary for the barrel working can be shortened to make a contribution to the cost reduction.

In the thrust roller bearing 1, moreover, the roller 3 is urged radially outward in the pocket 5 by the revolving centrifugal force. In the situation where the thrust roller bearing 1 revolves eccentrically, the axially outer end surface of the roller 3 may abut against the protrusion 8 disposed on the radially outer side of the inner wall surface of the pocket 5, or the axially inner end surface of the roller 3 may abut against the protrusion 9 disposed on the radially inner side of the inner wall surface of the pocket 5. In either case, however, the end surfaces of the roller 3 abut against the protrusions 8 and 9 disposed on the inner wall surfaces of the pocket 5, but the chamfered portions 3a of the roller 3 do not abut against the inner corners 5a of the pocket 5.

As to the abutting state between the end surfaces of the roller 3 and the protrusion 8 on the radially outer side or the protrusion 9 on the radially inner side, moreover, the substantially central portions of the end surfaces of the roller 3 are pivotally supported while abutting against the top portion of the projection 8 or the projection 9. As a result, these abutting portions have the frictional resistance of substantial zero, so that the friction loss is reduced.

What is claimed is:

1. A thrust roller bearing comprising:
   an annular plate;
   a cage formed in the annular plate, the cage including:
      a pair of substantially S-shaped bent portions formed at a radially intermediate area of the cage, the pair of bent portions being arranged in a circumferential direction of the cage;
      a pair of inner wall surfaces arranged in a radial direction of the cage; and
      a pocket for housing a roller, the pocket being defined by the pair of bent portions and the pair of inner wall surfaces and formed by punching the cage,
   wherein radially inner one of the inner wall surfaces is formed as a guiding surface for guiding a substantial roller PCD position of an end surface of the roller,
   wherein each of the pair of bent portions includes only a first extended portion extending in one of cage thickness directions; a second extended portion extending in the other cage thickness direction; and an intermediate sloped portion disposed between the first and second extended portions, and
   wherein a roller retaining pawl for retaining an outer circumference of the roller is provided at a top side surface of each of the first and second extended portions so as to protrude into the pockets.

2. The thrust roller bearing according to claim 1, wherein axially opposite ends of the roller are chamfered,
   corners of the pocket are rounded, and
   a protrusion that abuts against and pivotally supports a center portion of the end surface of the roller is provided at the guide surface.

3. The thrust roller bearing according to claim 2, wherein the protrusions have a round curved shape.

4. The thrust roller bearing according to claim 1, wherein the pocket has a substantially rectangular shape.

5. The thrust roller bearing according to claim 1, wherein the inner wall surfaces comprise sloped inner wall portions.

6. The thrust roller bearing according to claim 5, wherein the sloped inner wall portions have a substantially constant slope.

7. The thrust roller bearing according to claim 1, wherein the first extended portion and the second extended portion have a substantially flat, planar shape.

8. The thrust roller bearing according to claim 1, wherein the annular plate is substantially flat in regions other than the radially intermediate area where the cage is positioned.

9. The thrust roller bearing according to claim 1, wherein the inner wall surfaces are arranged at ends of the bent portions.

10. A thrust roller bearing, comprising:
    a cage, comprising:
       a pair of substantially S-shaped bent portions formed at a radially intermediate area of the cage, each crank-shaped bent portion comprising:
          a first extended portion extending in one of cage thickness directions;
          a second extended portion extending in the other cage thickness direction; and
          an inclined inner wall disposed between the first extended portion and the second extended portion;
       a pair of inner wall surfaces arranged in a radial direction of the cage; and
       a pocket for housing a roller, the pocket being defined by the pair of bent portions and the pair of inner wall surfaces,
    wherein the inner wall is formed as a guiding surface for guiding a substantial roller PCD position of an end surface of a roller.

11. The thrust roller bearing according to claim 10, wherein the sloped inner wall has a substantially constant slope.

12. The thrust roller bearing according to claim 10, wherein the first extended portion and the second extended portion have a substantially flat, planar shape.

13. The thrust roller bearing according to claim 10,
    wherein the cage includes only the first extended portion and the second extended portion.

14. The thrust roller bearing according to claim 10, wherein the pocket comprises a substantially rectangular shape with rounded corner.

15. The thrust roller bearing according to claim 10, wherein the pocket comprises a protrusion that abuts against and pivotally supports a center portion of an end surface of the roller.

16. A cage for supporting a roller in a thrust roller bearing, the cage comprising:
    a pair of substantially S-shaped bent portions formed at a radially intermediate area of the cage, each bent portion comprising:
       a first extended portion extending in one of cage thickness directions;
       a second extended portion extending in the other cage thickness direction; and
       an inclined inner wall disposed between the first extended portion and the second extended portion;
    a pair of inner wall surfaces arranged in a radial direction of the cage; and
    a pocket for housing a roller, the pocket being defined by the pair of bent portions and the pair of inner wall surfaces,
    wherein the inner wall is formed as a guiding surface for guiding a substantial roller PCD position of an end surface of a roller.

17. The cage according to claim 16, wherein the sloped inner wall has a substantially constant slope.

18. The cage according to claim 16, wherein the first extended portion and the second extended portion have a substantially flat, planar shape.

19. The cage according to claim 16, wherein the annular plate is substantially flat in regions other than the radially intermediate area where the cage is positioned, and
    wherein the cage includes only the first extended portion and the second extended portion.

* * * * *